United States Patent
Namba

(10) Patent No.: US 10,841,902 B2
(45) Date of Patent: Nov. 17, 2020

(54) RADIO TERMINAL APPARATUS, RADIO BASE STATION APPARATUS, AND RADIO COMMUNICATION METHOD

(71) Applicants: SHARP KABUSHIKI KAISHA, Osaka (JP); FG INNOVATION COMPANY LIMITED, Tuen Mun (HK)

(72) Inventor: Hideo Namba, Sakai (JP)

(73) Assignees: SHARP KABUSHIKI KAISHA, Osaka (JP); FG Innovation Company Limited, Tuen Mun (HK)

(*) Notice: Subject to any disclaimer, the term of this patent is extended or adjusted under 35 U.S.C. 154(b) by 0 days.

(21) Appl. No.: 16/310,380

(22) PCT Filed: Jun. 27, 2017

(86) PCT No.: PCT/JP2017/023489
§ 371 (c)(1),
(2) Date: Dec. 14, 2018

(87) PCT Pub. No.: WO2018/003769
PCT Pub. Date: Jan. 4, 2018

(65) Prior Publication Data
US 2019/0191412 A1    Jun. 20, 2019

(30) Foreign Application Priority Data

Jun. 30, 2016 (JP) .................................. 2016-129853
Jun. 30, 2016 (JP) .................................. 2016-129854

(51) Int. Cl.
*H04W 72/02* (2009.01)
*H04W 76/27* (2018.01)
(Continued)

(52) U.S. Cl.
CPC .......... *H04W 72/02* (2013.01); *H04L 1/1607* (2013.01); *H04L 1/1671* (2013.01);
(Continued)

(58) Field of Classification Search
CPC .......... H04W 72/042; H04W 72/0413; H04W 72/0446
See application file for complete search history.

(56) References Cited

U.S. PATENT DOCUMENTS 9,979,527 B2 *    5/2018    Jhang .................... H04L 5/0055

OTHER PUBLICATIONS

"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 10)", 3GPP TS 36.300 V10.12.0 (Dec. 2014).
(Continued)

*Primary Examiner* — Chandrahas B Patel
(74) *Attorney, Agent, or Firm* — ScienBiziP, P.C.

(57) ABSTRACT

Communication efficiency is improved in a case of using a grant-less communication scheme and a grant-based scheme. Provided is a radio terminal apparatus for communicating with a radio base station apparatus, which includes a transmitter configured to transmit a signal to the radio base station apparatus, a receiver configured to receive a signal from the radio base station, and a controller configured to control the transmitter and the receiver. The controller is capable of selecting at least a grant-based scheme or a grant-less communication scheme in a case of a transmission of user data. The user data and information necessary to allocate a radio resource are transmitted in a case that the grant-less communication scheme is selected to perform a transmission.

7 Claims, 9 Drawing Sheets

(51) Int. Cl.
*H04W 72/06* (2009.01)
*H04L 5/00* (2006.01)
*H04W 72/12* (2009.01)
*H04W 76/28* (2018.01)
*H04L 1/16* (2006.01)

(52) U.S. Cl.
CPC ........... *H04L 5/0055* (2013.01); *H04W 72/06* (2013.01); *H04W 72/1289* (2013.01); *H04W 76/27* (2018.02); *H04W 76/28* (2018.02)

(56) References Cited

OTHER PUBLICATIONS

"3rd Generation Partnership Project; Technical Specification Group Radio Access Network; Evolved Universal Terrestrial Radio Access (E-UTRA); Physical Channels and Modulation (Release 10)", 3GPP TS 36.211 V10.7.0 (Feb. 2013).

Huawei, "Text Proposal capturing outcome of email discussion: [91bis#34][LTE/LATRED] CB-PUSCH", 3GPP TSG-RAN WG2 #92, R2-156300, Anaheim, USA, Nov. 16-20, 2015.

ERICSSON, "Infrequent small data transmissions for inactive UEs", 3GPP TSG-RAN WG2 #94, Tdoc R2-164028, Nanjing, P.R. China, May 23-27, 2016.

Huawei, Hisilicon, "Consideration on grant free transmission for NR", 3GPP TSG-RAN WG2 Meeting #94, R2-164131, Nanjing, China, May 23-27, 2016.

\* cited by examiner

RADIO TERMINAL APPARATUS, RADIO BASE STATION APPARATUS, AND RADIO COMMUNICATION METHOD

TECHNICAL FIELD

The present invention relates to radio communication technologies.

BACKGROUND ART

Mobile communication technologies typified by mobile phones have been developed with the development of radio communication technologies. The mode of mobile phones has shifted from analog to digital, and mobile phones now handle data communication. In many cases, unlike continuous signals such as audio signals with a fixed amount of information, data communication handles information whose amount varies over time. For this reason, packet communication (for example, NPL 1) has become widespread. The packet communication employs scheduling in a grant-based scheme, in which a radio terminal apparatus (User Equipment; UE) used in a mobile phone network does not have any radio resources allocated thereto in a case that the radio terminal apparatus is not performing a communication, and requests to a base station apparatus (NodeB, NB, or eNB) radio resources to perform a communication by using the radio resources allocated in a case that the radio terminal has communication data.

In addition, integrated circuits have enabled small electronic devices to support communication function. Applications by using communication between devices have been developed, the communication being called Internet of Things (IoT) in which the communication function is supported on devices people do not directly operate and the devices are connected to the Internet. Such a device is usually designed to operate by using a built-in battery without using a power line.

Furthermore, such a device is usually produced for specific applications and in this case, a device is designed so that the device can perform a targeted application by exchanging minimum information.

CITATION LIST

Non Patent Literature

NPL 1: 3GPP TS36.300 V10.12.0 (2014 December)
NPL 2: 3GPP TS36.211 V10.7.0 (2013 February)

SUMMARY OF INVENTION

Technical Problem

However, in a case that the amount of information used by an application can be extremely small, the amount of information exchanged by a device used for the application during a single communication is also small. In such a case, a data communication method by using the grant-based scheme requires a procedure for requesting radio resources before exchanging information, and hence, it is not possible to ignore the amount of information required for the procedure for requesting the radio resources with respect to the amount of information to be exchanged and the time required for the procedure.

To reduce the effort to request the radio resources, studies have been made to introduce to mobile phones, a so-called grant-less communication scheme (also referred to as grant-free communication scheme) that does not use the procedure for requesting the radio resources. In radio networks for mobile phones, however, a scheduling scheme in which radio resources are requested and scheduled in advance in response to the radio resource requests is used. The scheduling scheme has a different purport from the grant-less communication scheme that uses the radio resources in an arguably disordered manner. Thus, a system that is efficient when using the scheme for scheduling the radio resources in advance and a system that is efficient when using the grant-less communication scheme are different from each other. In a case that both schemes are used, there is a problem in that a system needs to be prepared not to reduce efficiency.

Solution to Problem

An aspect of the present invention provides a radio terminal apparatus, in which both a grant-based scheme and a grant-less communication scheme can be selected in a case of a transmission of user data, and the user data and information necessary to allocate a radio resource are transmitted in a case of selecting the grant-less communication scheme to perform the transmission.

Moreover, according to another aspect of the present invention, there is provided a radio terminal apparatus, in which the information necessary to allocate the radio resource is a session identifier for identifying a connection between the radio base station apparatus and the radio terminal apparatus.

Moreover, according to another aspect of the present invention, there is provided a radio terminal apparatus, in which, in a case of receiving a NACK and radio resource allocation information after the transmission of the user data by using the grant-less communication scheme, the grant-based scheme is used to retransmit the user data.

Moreover, according to another aspect of the present invention, there is provided a radio base station apparatus, in which, in a case of receiving a signal, including a session identifier and user data, which is transmitted by the radio terminal apparatus by using the grant-less communication scheme, and in a case that an error exists in receiving the user data included in the signal received, a radio resource to be used in the grant-based scheme is allocated to the radio terminal apparatus, and a NACK and the radio resource allocated are transmitted to the radio terminal apparatus.

Moreover, according to another aspect of the present invention, there is provided a radio terminal apparatus, in which both a grant-based scheme and a grant-less communication scheme can be selected in a case of a transmission of user data, and in a case that the grant-less communication scheme is selected to perform the transmission, and that the user data and the information necessary to allocate the radio resource are transmitted, in a case that a size of the user data is greater than a predetermined value, the transmission in which data for indicating whether subsequent data exists is included is performed.

Moreover, according to another aspect of the present invention, there is provided a radio terminal apparatus, in which the information necessary to allocate the radio resource together with the user data includes at least a session identifier for identifying a connection with the radio base station apparatus.

Moreover, according to another aspect of the present invention, there is provided a radio terminal apparatus, in which, in a case of receiving an ACK and radio resource allocation information from the radio base station apparatus after a transmission using the grant-less communication scheme, data that has not been transmitted is transmitted to the radio base station apparatus by using the radio resource indicated by the allocation information received.

Moreover, according to another aspect of the present invention, there is provided a radio base station apparatus, which receives a signal, including a session identifier and user data, which is transmitted by the radio terminal apparatus by using the grant-less communication scheme, in which the session identifier corresponds to a connection with the radio terminal apparatus. In a case that the session identifier is received without error, the user data is received without error, and data for indicating whether subsequent data exists in the signal received indicates that the subsequent data exists, a radio resource to be used in the grant-based scheme is allocated to the radio terminal apparatus, and an ACK and the radio resource allocated are transmitted to the radio terminal apparatus.

Advantageous Effects of Invention

In a radio terminal apparatus that can select both a grant-based scheme and a grant-less communication scheme at the time of transmitting user data, the user data and information necessary to allocate a radio resource are transmitted in a case of selecting the grant-less selection communication scheme for transmission. This allows a radio resource to be allocated at the time of retransmission, and it is possible to efficiently switch between the grant-based scheme and the grant-less communication scheme.

DESCRIPTION OF EMBODIMENTS

Radio communication technologies according to embodiments of the present invention will now be described in detail with reference to the drawings.

First Embodiment

Figure 2:
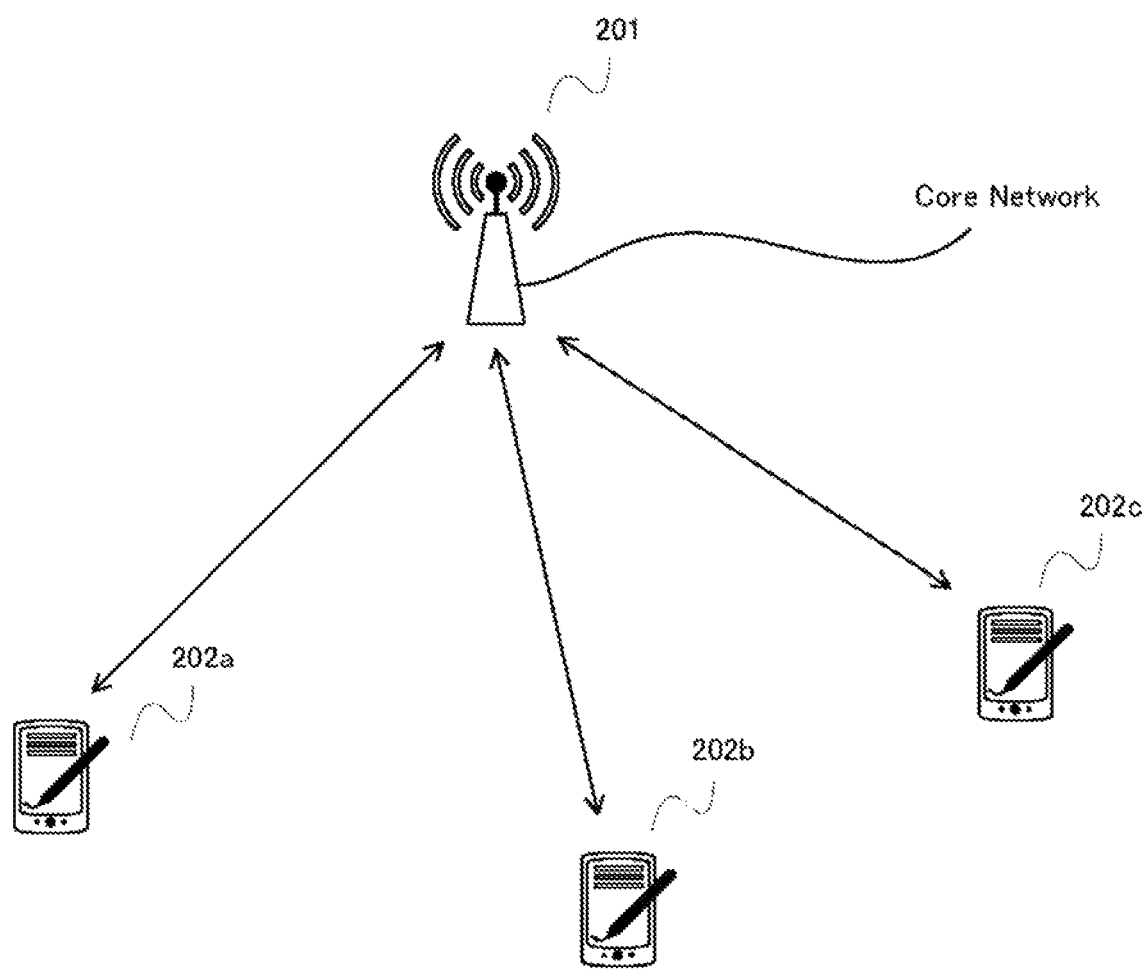
FIG. 2 is a diagram illustrating an example of a system configuration according to an embodiment of the present invention.

FIG. 2 illustrates an overview of an example radio communication system to which a first embodiment is applied.

A plurality of radio terminal apparatuses 202a to 202c are connected to a radio base station apparatus 201. The number of radio terminal apparatuses connected may depend on the capability of the radio base station apparatus 201, and may vary from time to time. The radio base station apparatus 201 is connected to a core network and communicates with several control devices in the core network to control and maintain the mobile phone network. In addition, the radio base station apparatus 201 can communicate with equipment on the Internet via some of the control devices.

Figure 3A:
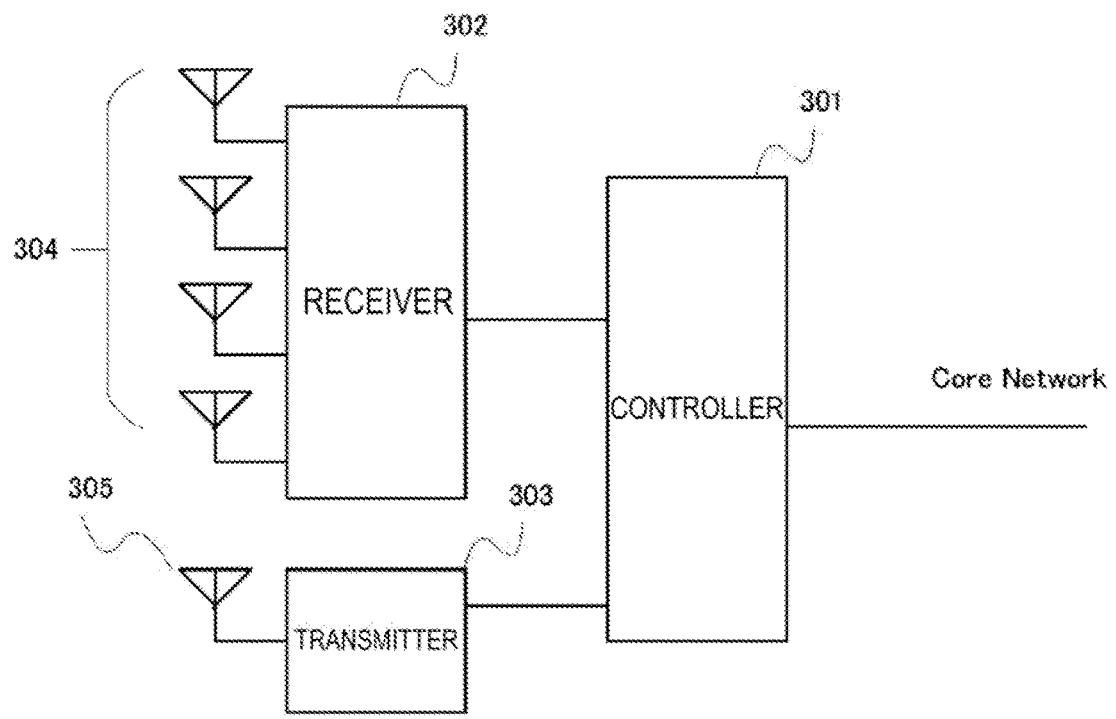
FIGS. 3A and 3B are diagrams, each illustrating an example of a configuration of units used in an embodiment of the present invention.

FIG. 3A illustrates an example schematic configuration of the radio base station apparatus 201. The reference sign 301 represents a controller configured to manage radio resources for transmission and radio resources for reception and control communication with the equipment on the core network. The reference sign 302 represents a receiver configured to demodulate and decode signals received by a receiving antenna unit 304 to retrieve information required for the controller 301 to manage the radio resources and to communicate with the equipment on the core network. The reference sign 304 represents the receiving antenna unit configured to receive radio signals and inputs the received signals to the receiver 302. The reference sign 303 represents a transmitter configured to generate transmit signals according to the radio resources for transmission controlled by the controller. The reference sign 305 represents a transmitting antenna unit configured to transmit the transmit signals generated by the transmitter 303. The receiving antenna unit 304 may include a plurality of antenna elements to demodulate signals arriving from the plurality of radio terminal apparatuses or to perform receive diversity. The transmitting antenna unit 305 may include a plurality of antenna elements to increase information included in the transmit signals through simultaneous transmission or to perform transmit diversity.

Figure 3B:
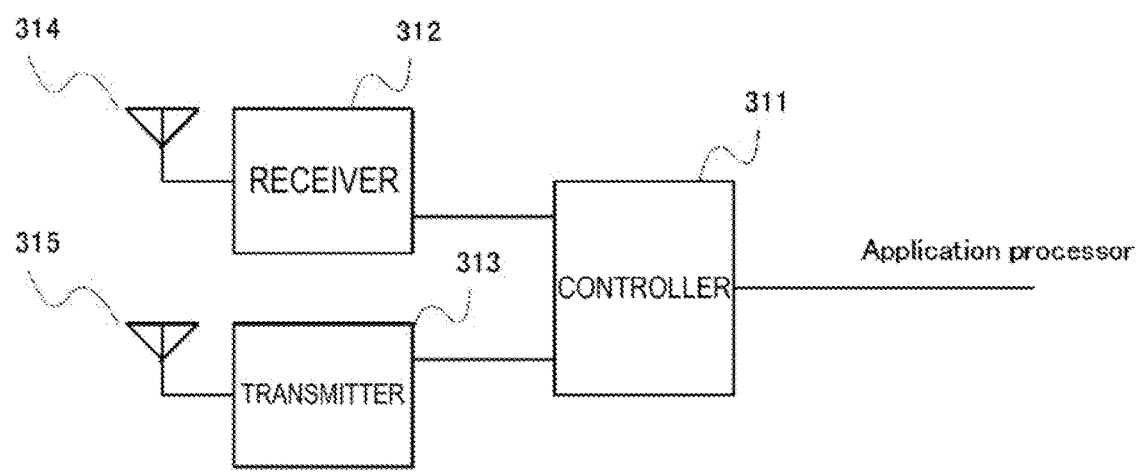

FIG. 3B illustrates an example schematic configuration of the radio terminal apparatuses 202a to 202c. The reference sign 311 represents a controller configured to manage radio resources for transmission by using received data obtained from a receiver 312, generate transmit data, input the transmit data into a transmitter 313, retrieve, from received signals, data used by the radio terminal apparatus to which the controller 311 belongs, and transmit and/or receive data to and/or from a connected application processor. The reference sign 312 represents the receiver configured to demodulate and decode received signals input from a receiving antenna unit 314 and perform output to the controller. The reference sign 314 represents the receiving antenna unit configured to input the received radio signals into the receiver 312. The reference sign 313 represents the transmitter configured to generate transmit signals according to information input from the controller. The reference sign 315 represents a transmitting antenna unit configured to transmit the transmit signals output from the transmitter. The receiving antenna unit 314 may include a plurality of antenna elements to demodulate signals arriving from the plurality of radio terminal apparatuses or to perform receive diversity. The transmitting antenna unit 315 may include a plurality of antenna elements to increase information included in the transmit signals through simultaneous transmission or to perform transmit diversity.

Figure 4:
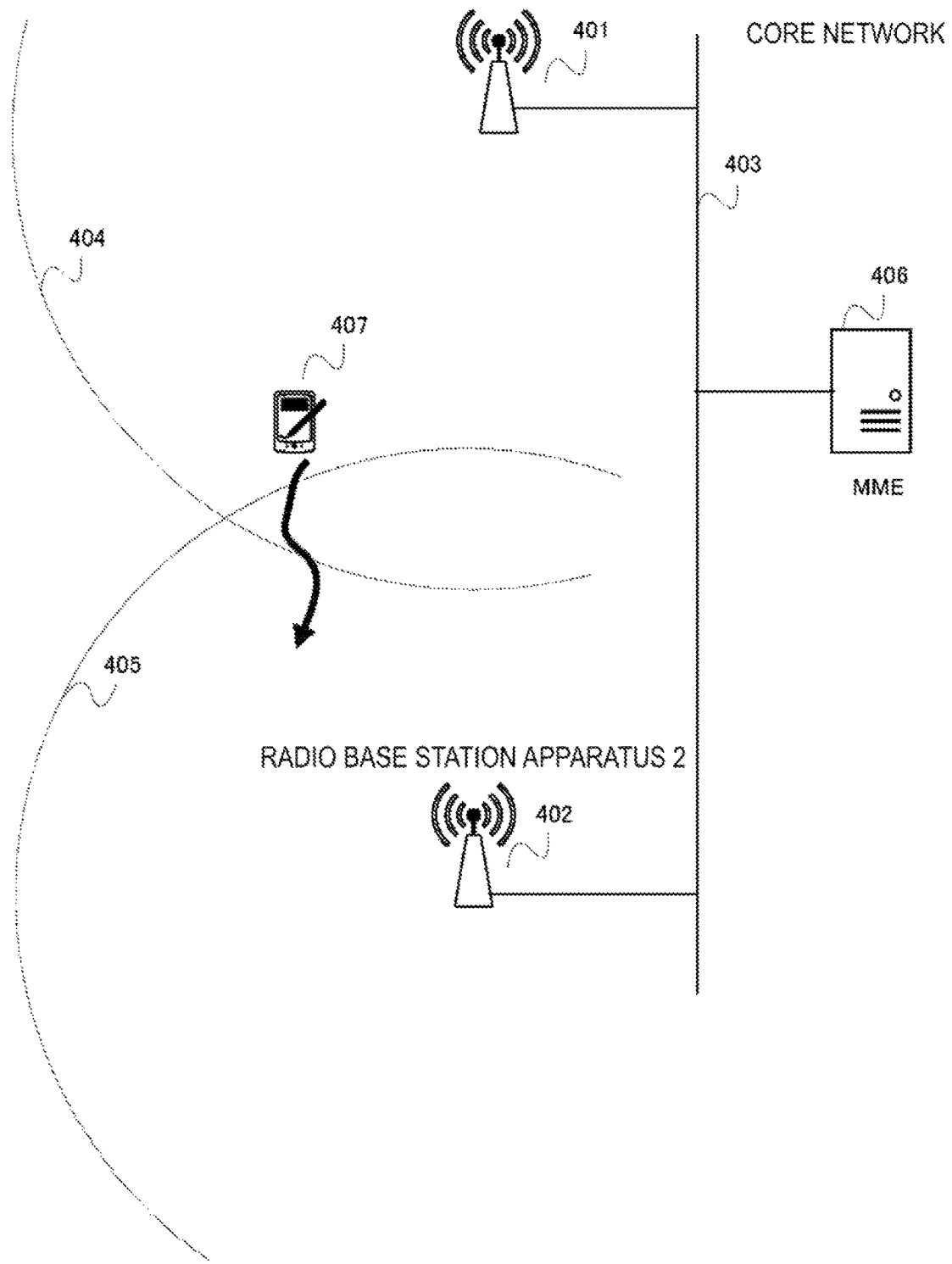
FIG. 4 is a diagram illustrating an example of a movement of a radio terminal apparatus according to an embodiment of the present invention.

A plurality of radio base station apparatuses are connected by the core network and managed by the equipment on the core network. By arranging the plurality of radio base station apparatuses at different locations to shift the communication areas that the respective radio base station apparatuses cover from each other, it is possible to expand the service area of the entire mobile phone network. In a case that a radio terminal apparatus connected to a radio base station apparatus moves out of the service area covered by the radio base station apparatus into the service area covered by another radio base station apparatus, the radio base station apparatuses cooperate with equipment on the core network to prevent the communication performed by the radio terminal apparatus from being interrupted. FIG. 4 illustrates an example of the configuration for achieving the operation described above. A radio base station apparatus 1.401 and a radio base station apparatus 2.402 are located at different locations and are connected via a core network 403. The radio base station apparatus 1.401 covers a service area 404, and the radio base station apparatus 2.402 covers a service area 405. A Mobility Management Entity (MME) 406 is also connected to the core network 403. A description will be made of an example of operation in a case that a radio terminal apparatus 407 moves out of the service area 404 of the radio base station apparatus 1.401 into the service area 405 of the radio base station apparatus 2.402 in the above-described configuration.

The radio terminal apparatus 407 periodically informs the radio base station apparatus 1.401 of the quality of signals transmitted from the radio base station apparatus 1 and the quality of signals transmitted from other radio base station apparatuses. In this case, the quality of the signals transmitted from the radio base station apparatus 2.402 is used as the quality of the signals transmitted from the other radio base station apparatuses. As the radio terminal apparatus 407 moves, in the quality information that the radio terminal apparatus 407 informs to the radio base station apparatus 1.401, the quality of the signals transmitted by the radio base station apparatus 2.402 becomes better than the quality of the signals transmitted by the radio base station apparatus 1.401. In a case that this state occurs, the radio base station apparatus 1.401 requests the radio base station apparatus 2.402 to cause the radio terminal apparatus 407 to be handed over to the radio base station apparatus 2.402. The radio base station apparatus 2.402 checks the state of radio resources that the radio base station apparatus 2.402 handles to determine whether to accept the handover, and notifies the radio base station apparatus 1.401 of the acceptance of the handover. The radio base station apparatus 1.401 indicates, to the radio terminal apparatus 407, a handover so that the current connection is changed to the connection to the radio base station apparatus 2.402. In addition, the radio base station apparatus 1.401 transfers, to the radio base station apparatus 2.402, a context required to manage the connection with the radio terminal apparatus 407. The radio terminal apparatus 407, to which the handover is indicated, starts a procedure with the radio base station apparatus 2.402 to reconfigure the connection from the current connection with the radio base station apparatus 1.401 to the connection with the radio base station apparatus 2.402 according to the instruction. The radio base station apparatus 2.402 uses the context of the radio terminal apparatus 407 received from the radio base station apparatus 1.401 to reconfigure the connection, and, in a case that the procedure is successfully completed, notifies the radio terminal apparatus 407 of the successful completion of the process. In addition, the MME 406 is notified of an allocation of a data path for the radio terminal apparatus 407. The MME 406 checks the connection of the radio terminal apparatus 407 and, in a case that the data path needs to be changed, cooperates with other equipment in the core network to secure a data path for the radio terminal apparatus 407.

While periodically reporting to the connected radio base station apparatus the quality of the signals transmitted from the radio base station apparatus, the radio terminal apparatus 407 uses a mechanism in which reception of radio signals, including reception of signals for the quality report, is less frequently performed to reduce the power consumption. This mechanism is called Discontinuous Reception (DRX). By notifying to the radio base station apparatus that the radio terminal apparatus 407 can use the DRX function, the radio terminal apparatus 407 can perform discontinuous reception during a period when no radio resources are allocated by the radio base station apparatus. The interval of the discontinuous reception is managed based on the system frame period. The information about the DRX is notified to the MME 406 through the base station. In a case that no radio resources are allocated to the radio terminal apparatus 407 for a long period of time, the radio terminal apparatus 407 may disconnect a connection and switch from the connected state to the idle state.

In a case that the radio terminal apparatus 407 enters in the idle state, a communication connection needs to be reconfigured to restart a communication. The procedure of reestablishing the connection is time-consuming and thus wastes time in an application in which the state is frequently changed between the idle state and the connected state, thus reducing the efficiency of the mobile phone network. In order to address this issue, in a case that no radio resources are allocated for a long period of time in the connected state, the connection is temporarily halted, and the context of the connection is saved during the halt. The saved context is reused at the time of resuming the connection. This allows the connection to be reestablished with less sequences compared with the procedure of establishing a connection. In order to identify the saved context at the time of resuming the connection, a session ID corresponding to the connection is prepared. Then, this session ID is specified to save the context at the time of temporarily halting the connection, and is specified to reuse the context at the time of resuming the connection.

Figure 5:
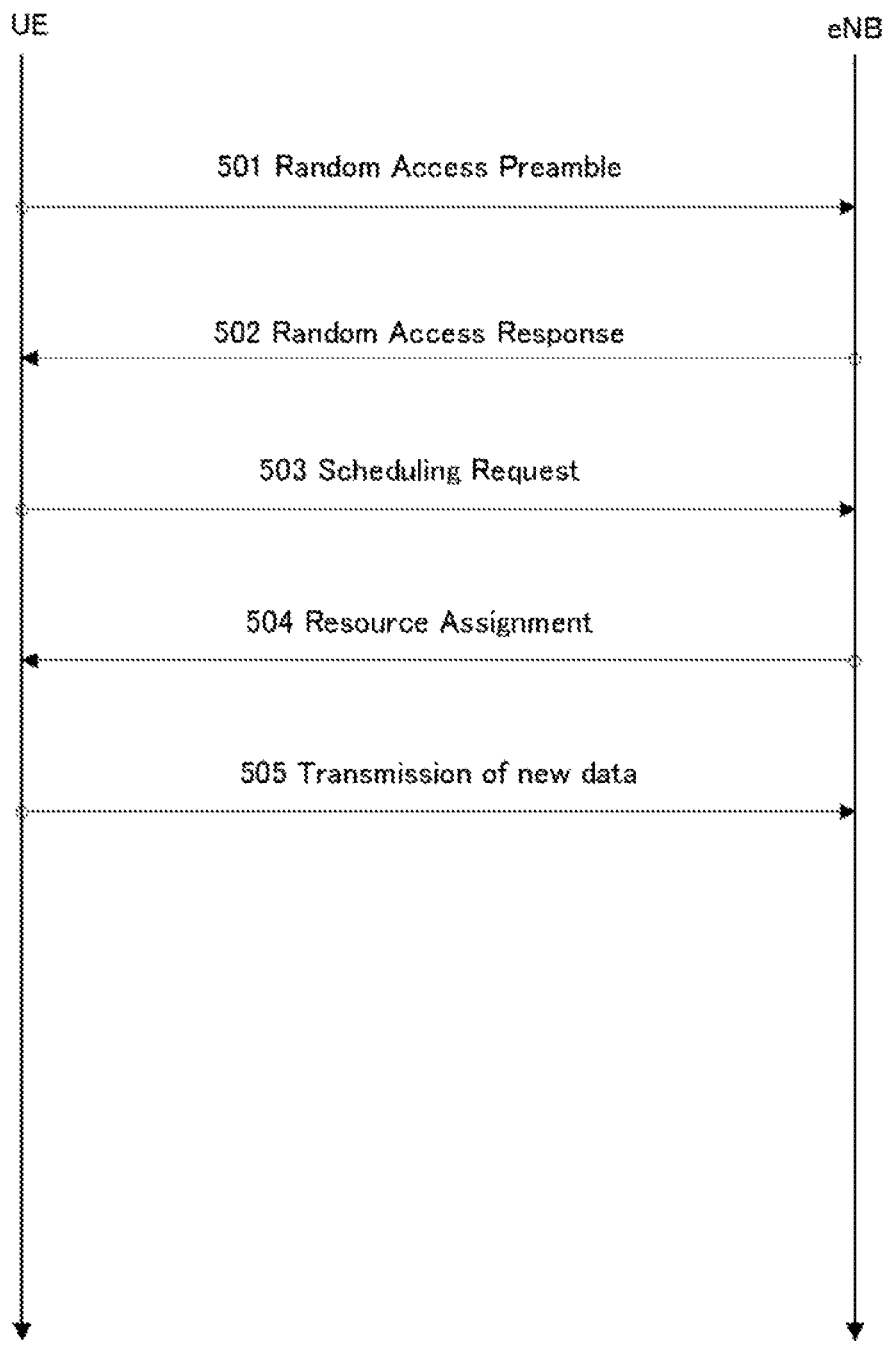
FIG. 5 is an example flow of a random access in a grant-based scheme.

FIG. 5 illustrates an overview of a flow of an example communication by using a typical grant-based scheme. In this example, a radio terminal apparatus performs a new communication with a radio base station apparatus. First, in the step 501, the radio terminal apparatus to which no radio resources are allocated uses an available random access channel to transmit a random access preamble including short information from the radio terminal apparatus to the radio base station apparatus. The information included in the random access preamble may include values randomly selected from several values based on the information notified by the radio base station apparatus. The radio base station apparatus, which receives the random access preamble, transmits, in the step 502, a random access response to the radio terminal apparatus that has transmitted the random access preamble. The random access response may include the information included in the random access preamble to indicate the random access preamble to which the random access response corresponds. In addition, the random access response may include an indication of a radio resource that the radio terminal apparatus then uses to transmit a scheduling request. The radio terminal apparatus, which receives the random access response, checks whether the received random access response corresponds to the random access preamble that the radio terminal apparatus itself has transmitted. In a case that the random access response corresponds to the random access preamble and specifies a radio resource for transmitting a scheduling request, the radio terminal apparatus transmits a scheduling request in the step 503. The scheduling request may include a connection configuration request in a case of an initial communication and, in a case that connection has been established, may include information about an identifier used for the established connection and a required radio resource. The radio base station apparatus, which receives the resource request, identifies the radio terminal apparatus that has transmitted the resource request by using the connection configuration request or the identifier used by the radio terminal apparatus that is already connected to the radio base station apparatus. The radio base station apparatus then prepares a radio resource to the radio terminal apparatus and notifies the radio terminal apparatus of the allocation of the prepared radio resource in the step 504. The radio terminal apparatus, which receives the notification of the radio resource allocation, verifies that the notification of the radio resource allocation is addressed to the radio terminal apparatus itself, and newly transmits transmission data by using the allocated radio resource in the following step 506.

In a case that a grant-less communication scheme is used, unlike the example illustrated in FIG. 5, a transmission of transmit data is newly started without transmitting information, such as 501 random access preamble and 503 resource request, for requesting the resource. In other words, the transmission of new transmit data is started without allocating the radio resource in advance. This means that, in particular, in a case that transmission is performed using the grant-less communication scheme in an environment where a plurality of radio terminal apparatuses exist, conflicts occur among a plurality of pieces of transmitted data, and the radio base station apparatus fails to demodulate and decode the content of the transmitted data. In a case of data transmission failure, retransmission is typically performed for recovery. However, using the grant-less communication scheme again during retransmission may cause another failure in transmission due to another conflict. If this situation continues, the utilization efficiency of the radio resources is degraded compared with that in transmission using the grant-based scheme.

In this embodiment, information required for radio resource allocation is transmitted in addition to the data to be transmitted at the initial transmission by using the grant-less communication scheme. In a case that the transmitted data are successfully demodulated and decoded, the radio base station apparatus only returns an acknowledgment (ACK), whereas in a case that the demodulation and the decoding of the transmitted data fail, radio resource allocation information for retransmission is transmitted together with a negative acknowledgment (HACK). An example of this procedure will be described with reference to FIGS. 1A and 1B.

Figure 1A:
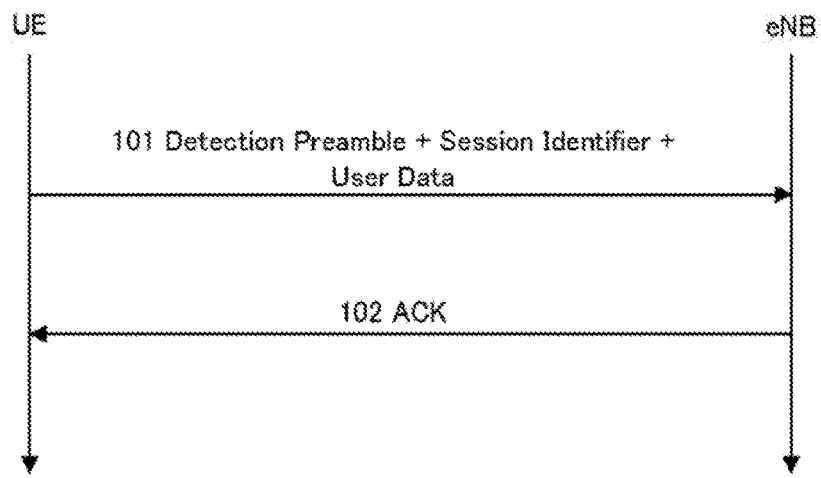
FIGS. 1A and 1B are diagrams, each illustrating a flow of information according to an embodiment of the present invention.

FIG. 1A illustrates an example of a procedure in a case of transmission of an ACK. It is assumed that the radio terminal apparatus is connected to the radio base station apparatus in advance and some pieces of information used for the connection, for example, a temporary identifier for identifying the radio terminal apparatus used for the connection and an identifier (session identifier) for identifying the connection, are assigned to the radio terminal apparatus. The session identifier may also have a function of identifying the radio terminal apparatus. In this case, an address space larger than the address space used by the temporary identifier for identifying the radio terminal apparatus may be assigned to the session identifier. For example, in a case that the address space of the temporary identifier for identifying the radio terminal apparatus is 16-bits in length, the address space used by the session identifier may be 24-bits or 40-bits in length to enable identification of a set of the connection and the radio terminal apparatus by using the session identifier. Although the radio terminal apparatus and the connection are identified by using the session identifier in the following example, information for identifying the radio terminal apparatus and information for identifying the connection may be separately transmitted. In the step 101, the radio terminal apparatus transmits, to the radio base station apparatus, a packet including a detection preamble for identifying a transmission as the transmission using the grant-less communication scheme, a session identifier, and user data by using the grant-less communication scheme. At this moment, the session identifier and the user data are transmitted in a format that can check whether the session identifier and the user data are correctly demodulated and decoded. For example, it may be possible to use a method in which a CRC code for error detection is added to each of the session identifier and the user data. The radio base station apparatus receives the packet transmitted from the radio terminal apparatus using the grant-less communication scheme, demodulates and decodes the session identifier and the user data included in the packet, and then checks whether the session identifier and the user data are correctly demodulated and decoded. After the session identifier and the user data are correctly decoded, the radio base station apparatus transmits an ACK in the step 503 to the radio terminal apparatus that has transmitted the packet.

Figure 1B:
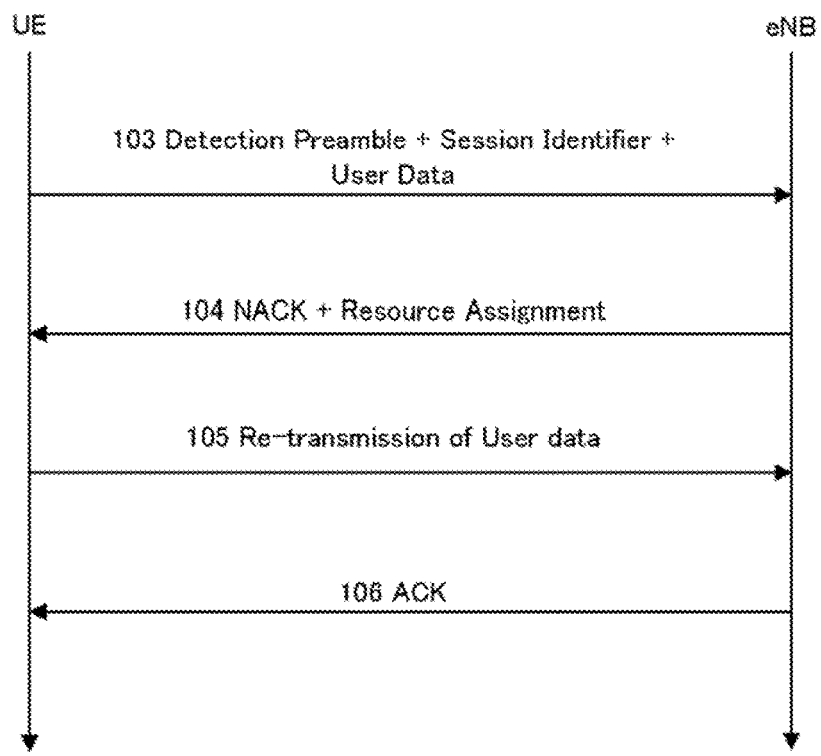

FIG. 1B illustrates an example of a procedure in a case of transmission of a NACK. Like the case in FIG. 1A, it is assumed that a session identifier for identifying the terminal and the connection is assigned in advance. In the step 103, the radio terminal apparatus transmits, to the radio base station apparatus, a packet including a detection preamble for identifying a transmission as the transmission using the grant-less communication scheme, a session identifier, and user data. The radio base station apparatus, which receives the packet, demodulates and decodes the session identifier and the user data included in the packet and checks whether the session identifier and the user data are correctly demodulated and decoded. In a case that the session identifier is successfully demodulated and decoded and that the demodulation and the decoding of the user data fail, the radio base station apparatus transmits, to the radio terminal apparatus, a NACK and radio resource allocation information for retransmission in the step 104. Since the session identifier is correctly received, it is possible to identify a radio terminal apparatus from which the packet is received and a connection through which the packet is received, and thus, a radio resource for a communication using this connection can be allocated. The radio terminal apparatus that receives the NACK and the radio resource allocation for retransmission determines that the preceding transmission using the grant-less communication scheme has failed, and then uses the radio resource allocated for retransmission to retransmit the user data in the step 105. The radio base station apparatus, which receives the retransmitted user data by using the allocated radio resource, checks that the user data is successfully demodulated and decoded, and transmits an ACK to the radio terminal apparatus in the step 106.

In this manner, the radio base station apparatus performs, to the radio terminal apparatus, a process for transmitting the ACK and a process for transmitting the NACK. This makes it possible to efficiently switch between the grant-less communication scheme and the grant-based scheme, thus allowing radio resources to be efficiently used.

Second Embodiment

Figure 6:
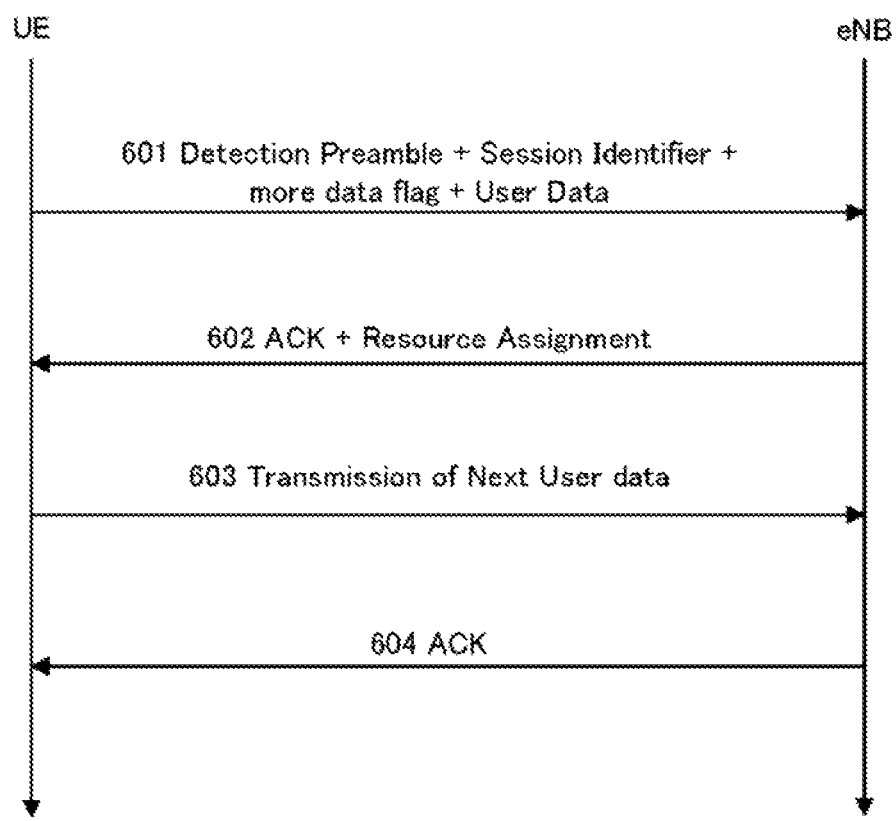
FIG. 6 is a diagram illustrating a flow of information according to an embodiment of the present invention.

In a second embodiment, in a case that large data is divided for transmission, the beginning portion is transmitted by using the grant-less communication scheme, and the remaining portion is transmitted by using the grant-based scheme. An example of this case is illustrated in FIG. 6. First, in the step 601, the radio terminal apparatus transmits, by using the grant-less communication scheme, a packet that includes a detection preamble for identifying a transmission using the grant-less communication scheme, a session identifier, a more data flag for indicating whether subsequent data exists, and user data. The more data flag may include only information for indicating whether subsequent data exists, or may include information for indicating the amount of subsequent data, for example, the amount of transmission data remaining in a transmission buffer of the radio terminal apparatus. The information for determining whether the session identifier, the more data flag, and the user data are correctly demodulated and decoded is included in the packet for transmission. The radio base station apparatus that receives this packet demodulates and decodes the received packet, and checks whether the session identifier, the more data flag, and the user data are correctly demodulated and decoded. In a case that the more data flag indicates that subsequent data exists, the radio base station apparatus transmits radio resource allocation information for transmitting an ACK and the subsequent data in the step 602. The radio terminal apparatus that receives the ACK and the radio resource allocation information transmits the remaining user data by using a radio resource allocated in the step 603. The radio base station apparatus that receives the user data and successfully demodulates and decodes transmits an ACK in the step 604, and a series of transmission operations ends. In a case that the radio terminal apparatus does not completely transmit the remaining transmission data in the step 603, it may be possible to add a more data flag to the transmission data to indicate that some data have not been transmitted, and request the radio base station apparatus to further allocate radio resources. In a case that the radio base station apparatus fails to receive the packet by using the grant-less communication scheme, like the first embodiment, it may be possible to transmit a NACK and radio resource allocation for retransmission.

As described above, by adding the information for indicating that subsequent data exists in a case of the transmission using the grant-less communication scheme, and by switching to the grant-based scheme, radio resources can be used efficiently.

Third Embodiment

Figure 7:
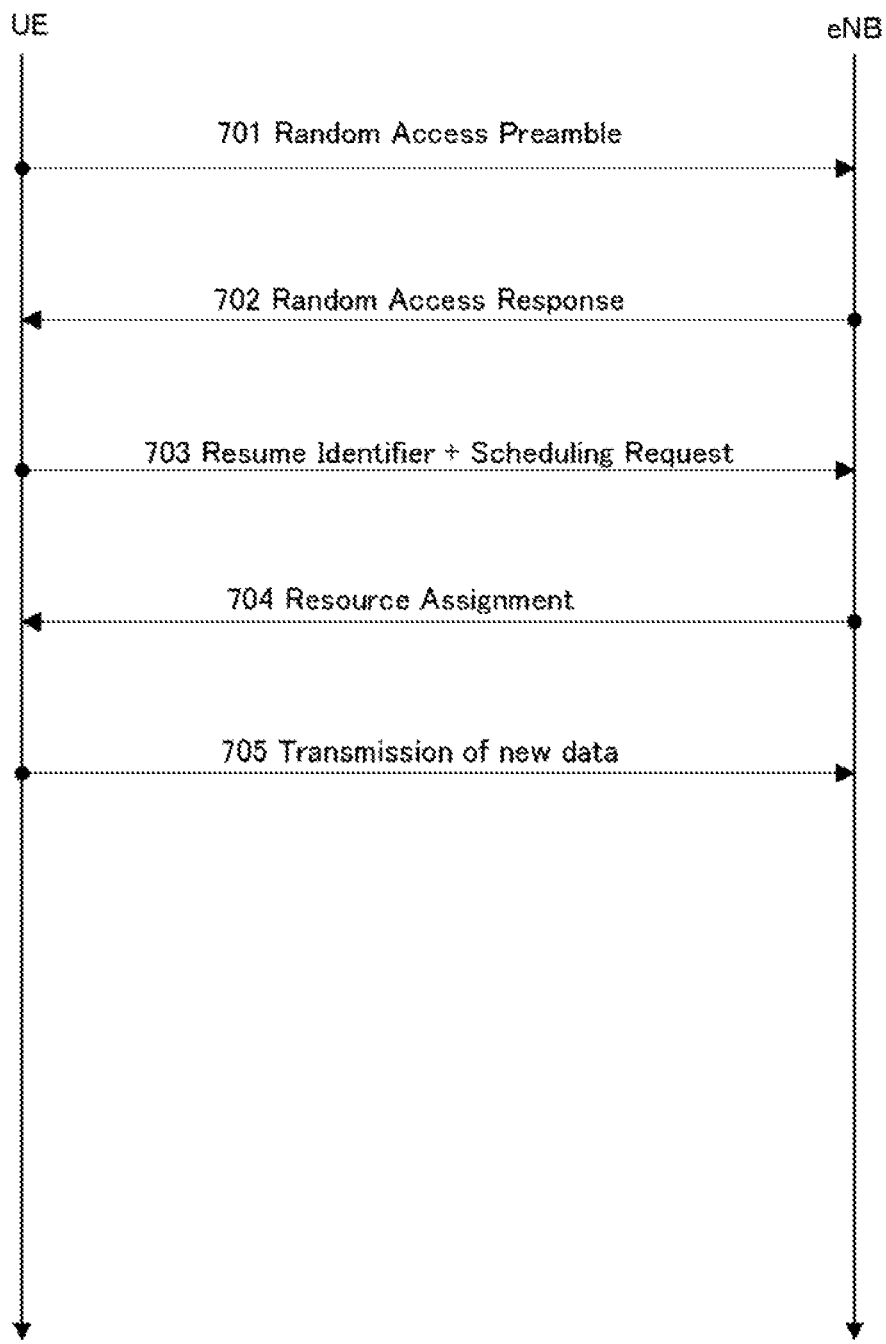
FIG. 7 is a diagram of a flow of an example of connection resumption in the grant-based scheme.

An example of a procedure, by using a session identifier, for recovering a connection from the idle state will now be described with reference to FIG. 7. In the step 701, a radio terminal apparatus uses a random access channel to transmit a random access preamble to a radio base station apparatus. The radio base station apparatus, which receives the random access preamble, transmits a random access response including radio resource allocation for transmitting a scheduling request to the radio terminal apparatus in the step 702. The radio terminal apparatus that receives the random access response determines whether the random access response corresponds to the random access preamble that the radio terminal apparatus itself has transmitted. In a case that the random access response corresponds to this random access preamble, the radio terminal apparatus transmits a scheduling request in the step 703. At this moment, a resume identifier is transmitted in addition to the scheduling request. The resume identifier is used to identify the preceding connection for the resumption of the connection and may be similar to the session identifier. The radio base station apparatus that receives the resume identifier and the scheduling request determines which radio terminal apparatus has transmitted the received scheduling request, and also determines whether the radio base station apparatus retains, with the radio terminal apparatus, a resumable connection indicated by the received resume identifier. At this moment, it may be possible to use only the resume identifier to determine whether the identification and the connection of the radio terminal apparatus are retained. In a case that information about a connection corresponding to the identified radio terminal apparatus is retained, the radio base station apparatus allocates, in the step 704, a radio resource based on the retained information about the connection without any specific procedure for connection configuration, and transmits the radio resource allocation information to the radio terminal apparatus. The radio terminal apparatus, which receives the radio resource allocation information, uses the received radio resource allocation information to transmit user data in the step 705. The embodiment describes an example of improving the efficiency in the series of steps described above by using the grant-less communication scheme at the time of resuming the connection.

Figure 8A:
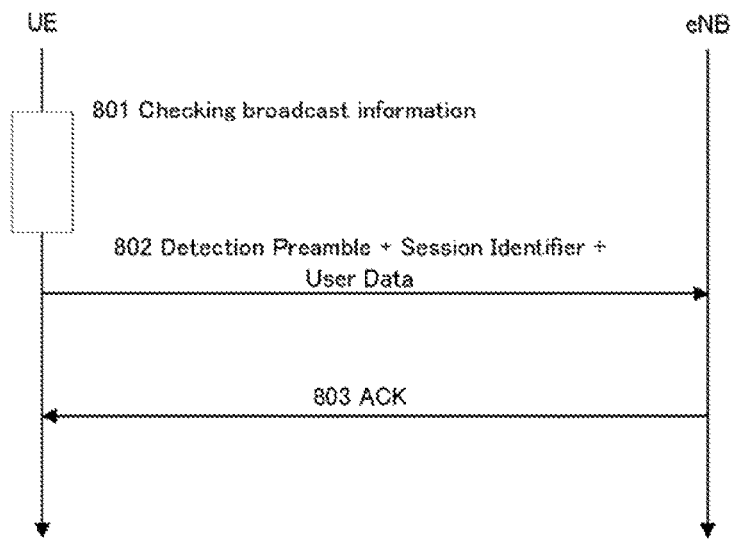
FIGS. 8A and 8B are diagrams, each illustrating a flow of information according to an embodiment of the present invention.
Figure 8B:
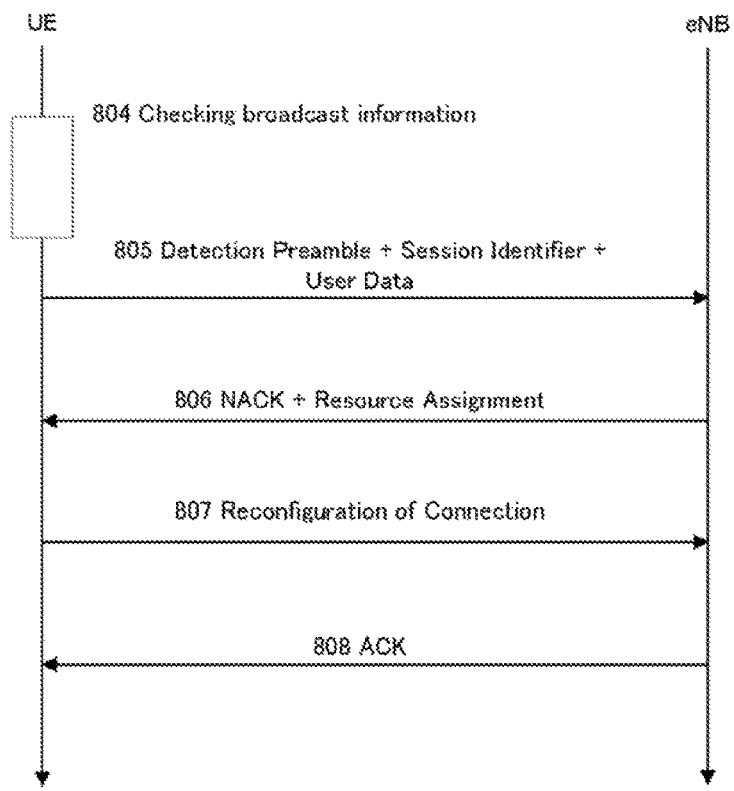

FIGS. 8A and 8B each illustrate an example of a flow of information according to the embodiment. FIG. 8A illustrates an example of a case of successful connection resumption, and FIG. 8B illustrates an example of a case of unsuccessful connection resumption followed by a connection reconfiguration. First, the example of successful connection resumption will be described. In a case that a radio terminal apparatus tries to recover a connection from the idle state, the radio terminal apparatus first receives broadcast information transmitted by a radio base station apparatus and determines, by using the broadcast information, whether there is a possibility that the radio base station apparatus retains information about the connection that has existed before the radio base station apparatus switches to the idle state. Although no particular limitation is applied to a method of determining the possibility by using the broadcast information, it may be possible to make the determination, for example, by comparing a physical identifier, a virtual identifier, a tracking area code, a CSG identifier, frequency information, and the like of a cell managed by the radio base station apparatus, between the states before and after switching to the idle state. After determining that the connection information is retained, the radio terminal apparatus transmits, in the step 802, a packet including a detection preamble for identifying a transmission as the transmission in the grant-less communication scheme, a session identifier, and user data, to the radio base station apparatus by using the grant-less communication scheme. The radio base station apparatus, which receives the packet, checks whether the session identifier and the user data included in the packet can be correctly demodulated and decoded. In a case that the session identifier and the user data are correctly demodulated and decoded, the radio base station apparatus determines whether the session identifier corresponds to the connection information that the radio base station apparatus retains. In a case that this session identifier corresponds to the connection information that the radio base station apparatus retains, the radio base station apparatus recovers the connection and processes the user data, which is transmitted together with the session identifier, on the assumption that the user data is transmitted through the connection. Then, the radio base station apparatus transmits an ACK to the radio terminal apparatus in the step 803. By using the procedure as described above, a part of the procedure for radio resource allocation at the time of the connection recovery can be omitted, thus allowing the utilization efficiency of the radio resources to be improved.

Next, an example of a case of unsuccessful connection recovery will be described with reference to FIG. 8B. In the step 804, the radio terminal apparatus receives broadcast information transmitted by the radio base station apparatus, and determines, by using the broadcast information, whether there is a possibility that the radio base station apparatus retains the connection information before the transition to the idle state. This operation is similar to the step 801. After determining that the connection information is retained, the radio terminal apparatus transmits, in the step 805, a packet including a detection preamble for identifying a transmission as the transmission in the grant-less communication scheme, a session identifier, and user data, to the radio base station apparatus by using the grant-less communication scheme. This operation is similar to the step 802. The radio base station apparatus, which receives the packet, checks whether the session identifier and the user data included in the packet can be correctly demodulated and decoded. In a case that the session identifier and the user data are correctly demodulated and decoded, the radio base station apparatus determines whether the session identifier corresponds to the connection information that the radio base station apparatus retains. In a case that the session identifier does not correspond to the connection information that the radio base station apparatus itself retains or in a case that the radio base station apparatus does not retain any connection information, the radio base station apparatus discards the received user data and, in the step 806, transmits to the radio terminal apparatus a NACK and radio resource allocation information for the connection reconfiguration. The radio base station apparatus may transmit, like the step 806, the NACK and the radio resource allocation information for reconfiguring the connection in a case that the session identifier is successfully demodulated and decoded, the demodulation and the decoding of the user data fail, and the radio base station apparatus does not retain the connection information corresponding to the session identifier. The radio terminal apparatus that receives the NACK and the radio resource allocation information transmits, in the step 807, a connection reconfiguration request to the radio base station apparatus by using the allocated radio resource. The radio base station apparatus that receives the connection reconfiguration request reconfigures the connection with the radio terminal apparatus by using the received connection reconfiguration request, and, in a case of successful reconfiguration, transmits an ACK to the radio terminal apparatus in the step 808. In a case that the connection resumption using the grant-less communication scheme fails, the above operations allow the connection to be reconfigured so that the communication can be continued.

Figure 9:
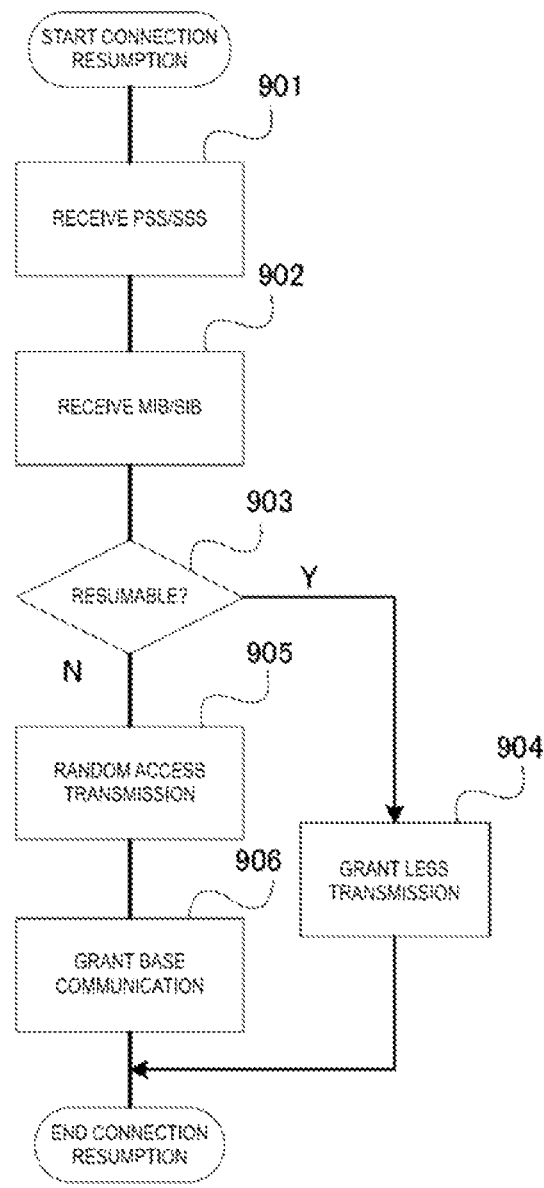
FIG. 9 is a flowchart illustrating the procedure of resuming connection according to an embodiment of the present invention.

An example of processing performed by the radio terminal apparatus to achieve the above-described procedure will now be described with reference to FIG. 9. In a case of trying to resume the connection, the radio terminal apparatus first receives, in the step 901, a Primary Synchronization Signal (PSS) and a Secondary Synchronization Signal (SSS) broadcast from the radio base station apparatus to perform acquisition of a physical cell identifier and frame synchronization. Next, in the step 902, the radio terminal apparatus receives a Master Information Block (MIB) and System Information Blocks (SIBs) transmitted from the radio base station apparatus. Next, in the step 903, the radio terminal apparatus determines, by using the information acquired in the steps 901 and 902, whether the radio base station apparatus that has transmitted the received signals can resume the connection. The example of the determination method has been described above. It is possible to make determination, for example, by comparing the state of a physical identifier, a virtual identifier, a tracking area code, a CSG identifier, frequency information, or the like of a cell managed by the radio base station apparatus, with the state thereof before transition to the idle state. In a case that it is determined that the connection is resumable, the process proceeds to the step 904, and the transmission using the grant-less communication scheme is started. In a case that it is determined that the connection is not resumable, the process proceeds to the step 905, and the radio terminal apparatus performs a random access transmission to start communication using the grant-based scheme. The radio terminal apparatus receives a radio resource allocation from the radio base station apparatus and starts the transmission using the grant-based scheme in the step 906. The random access transmission and the transmission in the grant-based scheme are not specifically limited. For example, the procedures described in NPL 1 may be used.

Programs operating in the apparatuses according to the present invention may be programs that control a Central Processing Units (CPU) or the like to cause a computer to function so as to achieve the functions of the embodiments according to the present invention. The program or information handled by the program is temporarily stored in a volatile memory such as Random Access Memory (RAM), a nonvolatile memory such as flash memory, a Hard Disk Drive (HDD), or any other storage device system.

It should be noted that the programs for achieving the functions of the embodiments according to the present invention may be recorded in a computer-readable storage medium. The functions may be achieved by causing a computer system to load and execute the program recorded in the storage medium. It is assumed that the "computer system" refers to a computer system built into the apparatus, and the computer system includes an operating system and hardware components such as a peripheral device. In addition, the term "computer-readable storage medium" may refer to a semiconductor storage medium, an optical storage medium, a magnetic storage medium, a medium dynamically retaining the programs for a short period of time, or any other computer-readable storage medium.

Moreover, functional blocks or features of the apparatuses used in the above-described embodiments may be implemented or performed by an electrical circuit, for example, an integrated circuit or a plurality of integrated circuits. The electrical circuit designed to perform the functions described in the present specification may include a general-purpose processor, a Digital Signal Processor (DSP), an Application Specific integrated Circuit (ASIC), a Field Programmable Gate Array (FPGA), or any other programmable logic device, a discrete gate or transistor logic, discrete hardware components, or any combinations of these elements. The general purpose processor may be a microprocessor or may be a typical processor, a controller, a micro controller, or a state machine. The above-described electrical circuit may be composed of a digital circuit or may be composed of an analog circuit. In a case that integrated circuit technologies replacing the current integrated circuits emerge with advances in semiconductor technology, one or more aspects according to the present invention may use a new integrated circuit obtained through the technologies.

Note that the invention of the present patent application is not limited to the above-described embodiments. Although examples of apparatuses are described in the embodiments, the present invention is not limited to these apparatuses and is applicable to stationary or non-portable electronic devices installed indoors or outdoors including, for example, audio-visual equipment, kitchen appliance, cleaning and washing equipment, air conditioning equipment, office equipment, vending machines, and other terminal apparatuses or communication apparatuses such as household equipment.

The embodiments of the present invention have been described in detail above referring to the drawings, but the specific configuration is not limited to the embodiments and includes, for example, an amendment to a design that falls within the scope that does not depart from the gist of the present invention. Furthermore, various modifications are possible within the scope of the present invention defined by claims, and embodiments that are made by suitably combining technical means disclosed according to the different embodiments are also included in the technical scope of the present invention. Furthermore, a configuration in which constituent elements, described in the respective embodiments and having mutually the same effects, are substituted for one another is also included in the technical scope of the present invention.

INDUSTRIAL APPLICABILITY

The present invention is applicable to a radio communication apparatus.

It should be noted that the present international application claims priority based on and claims priority from Japanese Patent Application Nos. 2016-129853 and 2016-129854 filed on Jun. 30, 2016, and the entire contents of Japanese Patent Application Nos. 2016-129853 and 2016-129854 are incorporated herein by reference.

REFERENCE SIGNS LIST 201 radio base station apparatus
202a to 202c radio terminal apparatus
301 controller
302 receiver
303 transmitter
304 receiving antenna unit.
305 transmitting antenna unit
311 controller
312 receiver
313 transmitter
314 receiving antenna unit
315 transmitting antenna unit
401 radio base station apparatus 1
402 radio base station apparatus 2
403 core network
404 service area of radio base station apparatus 1
405 service area of radio base station apparatus 2
406 MME
407 radio terminal apparatus

The invention claimed is:

1. A radio terminal apparatus for communicating with a radio base station apparatus, the radio terminal apparatus comprising:

a transmitter configured to transmit a signal to the radio base station apparatus;
a receiver configured to receive a signal from the radio base station apparatus; and
a controller configured to control the transmitter and the receiver, wherein
the controller is capable of selecting at least a grant-based scheme or a grant-less communication scheme in a case of a transmission of user data,
the user data and information necessary to allocate a radio resource are transmitted in a case that the grant-less communication scheme is selected to perform a transmission,
the information necessary to allocate a radio resource is signaled by prescribed identifier, and
in a case of receiving a NACK and radio resource allocation information after the transmission of the user data by using the grant-less communication scheme, the controller is configured to use the radio resource allocation information to retransmit the user data by using the grant-based scheme.

2. A radio terminal apparatus for communicating with a radio base station apparatus, the radio terminal apparatus comprising:

a transmitter configured to transmit a signal to the radio base station apparatus;
a receiver configured to receive a signal from the radio base station apparatus; and
a controller configured to control the transmitter and the receiver, wherein
the controller is capable of selecting at least a grant-based scheme or a grant-less communication scheme in a case of a transmission of user data,
the user data and information necessary to allocate a radio resource are transmitted in a case that the grant-less communication scheme is selected to perform a transmission, and
the information necessary to allocate the radio resource is a session identifier for identifying a connection between the radio base station apparatus and the radio terminal apparatus.

3. The radio terminal apparatus according to claim 2, wherein
the controller is configured to manage at least two modes that include a connected state and an idle state,
a connection with the radio base station apparatus is temporarily halted to switch to the idle state,
in a case of resuming the connection along with the transmission of the user data from the idle state, the transmission of the user data is performed by using the grant-less communication scheme, and
in a case of the transmission of the user data, an identifier for identifying the connection with the radio base station apparatus is added and transmitted.

4. The radio terminal apparatus according to claim 2, wherein
in a case that the grant-less communication scheme is selected to perform the transmission, and that the user data and the information necessary to allocate the radio resource are transmitted,
in a case that a size of the user data is greater than a predetermined value, the controller is configured to perform the transmission in which data for indicating whether subsequent data exists is included.

5. A radio communication method to be used in a radio terminal apparatus for communicating with a radio base station apparatus, the radio communication method comprising:
- selecting at least a grant-based scheme or a grant-less communication scheme in a case of transmitting user data; and
- transmitting the user data and information necessary to allocate a radio resource in a case of selecting the grant-less communication scheme, wherein
- the information necessary to allocate the radio resource is a session identifier for identifying a connection between the radio base station apparatus and the radio terminal apparatus.

6. A radio communication method to be used in a radio base station apparatus for communicating with a radio terminal apparatus, the radio communication method comprising:
- selecting at least a grant-based scheme or a grant-less communication scheme in a case of communicating with the radio terminal apparatus;
- receiving a signal that includes a first portion including a session identifier and a second portion including user data, the signal being transmitted by the radio terminal apparatus by using the grant-less communication scheme;
- in a case that the first portion is received without error and an error in receiving the second portion exists,
- allocating to the radio terminal apparatus, a radio resource to be used in the grant-based scheme, and
- transmitting to the radio terminal apparatus, a NACK and the radio resource allocated; and
- in a case that no error in receiving the first portion and the second portion exists, and that the signal received includes information for indicating that subsequent data exists,
- allocating to the radio terminal apparatus, a radio resource to be used in the grant-based scheme, and
- transmitting to the radio terminal apparatus, an ACK and the radio resource allocated.

7. A radio base station apparatus for communicating with a radio terminal apparatus, the radio base station apparatus comprising:
- a transmitter configured to transmit a signal to the radio terminal apparatus;
- a receiver configured to receive a signal from the radio terminal apparatus; and
- a controller configured to control the transmitter and the receiver, wherein
- the controller is capable of selecting at least a grant-based scheme or a grant-less communication scheme in a case of communication with the radio terminal apparatus,
- in a case of receiving a signal that includes a first portion including a session identifier and a second portion including user data, the signal being transmitted by the radio terminal apparatus by using the grant-less communication scheme,
- in a case that the first portion is received without error and an error in receiving the second portion exists,
- the controller allocate, to the radio terminal apparatus, a radio resource to be used in the grant-based scheme, and
- a NACK and the radio resource allocated are transmitted to the radio terminal apparatus,
- in a case that no error in receiving the first portion and the second portion exists, and that the signal received includes information for indicating that subsequent data exists,
- a radio resource to be used in the grant-based scheme is allocated to the radio terminal apparatus, and
- an ACK and the radio resource allocated are transmitted to the radio terminal apparatus.

\* \* \* \* \*